United States Patent
Lei et al.

(10) Patent No.: US 10,945,293 B2
(45) Date of Patent: Mar. 9, 2021

(54) FREQUENCY HOPPING FOR TWO-STEP RANDOM ACCESS

(71) Applicant: QUALCOMM Incorporated, San Diego, CA (US)

(72) Inventors: Jing Lei, San Diego, CA (US); Seyong Park, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,708

(22) Filed: Feb. 27, 2020

(65) Prior Publication Data
US 2021/0029743 A1    Jan. 28, 2021

Related U.S. Application Data

(60) Provisional application No. 62/878,579, filed on Jul. 25, 2019.

(51) Int. Cl.
*H04W 74/08*  (2009.01)
*H04B 1/713*  (2011.01)

(52) U.S. Cl.
CPC ........ *H04W 74/0833* (2013.01); *H04B 1/713* (2013.01)

(58) Field of Classification Search
None
See application file for complete search history.

(56) References Cited

U.S. PATENT DOCUMENTS

2008/0253431 A1* 10/2008 Ohba .................. H04B 1/7136
                                                          375/136
2011/0237265 A1*  9/2011 Sugawara ............ H04L 1/1887
                                                          455/450

(Continued)

FOREIGN PATENT DOCUMENTS

WO         2018118218 A1     6/2018

OTHER PUBLICATIONS

CMCC: "Discussion on Channel Structure for Two-Step RACH", 3GPP Draft, R1-1906511, 3GPP TSG RAN WG1 #97, 3rd Generation Partnership Project (3GPP), Mobile Competence Centre, 650, Route Des Lucioles, F-06921, Sophia-Antipolis, Cedex, France, vol. RAN WG1. No. Reno, USA, May 13, 2019-May 17, 2019, May 13, 2019 (May 13, 2019), XP051727961, pp. 1-5, Retrieved from the Internet: URL:http://www.3gpp.org/ftp/Meetings%5F3GPP%5FSYNC/RAN1/Docs/R1%2D1906511%2Ezip [retrieved on May 13, 2019].

(Continued)

*Primary Examiner* — Ayanah S George
(74) *Attorney, Agent, or Firm* — Harrity & Harrity, LLP/Qualcomm

(57) ABSTRACT

Various aspects of the present disclosure generally relate to wireless communication. In some aspects, a user equipment (UE) may receive, from a base station, configuration information for a two-step random access procedure. The UE may determine a frequency hopping space for transmitting a payload of a two-step random access channel of the two-step random access procedure. The UE may encode the payload into one or more codewords. The UE may map the one or more codewords to a plurality of resource units of the frequency hopping space. The UE may transmit the one or more codewords to the base station on the plurality of (Continued)

resource units of the frequency hopping space. Numerous other aspects are provided.

30 Claims, 9 Drawing Sheets

(56) References Cited

U.S. PATENT DOCUMENTS

| | | | | |
|---|---|---|---|---|
| 2013/0265975 | A1* | 10/2013 | Shirani-Mehr | H04W 76/19 370/329 |
| 2013/0332498 | A1* | 12/2013 | Vickers | G06F 17/156 708/300 |
| 2016/0150504 | A1* | 5/2016 | Chae | H04W 76/14 375/133 |
| 2017/0171865 | A1* | 6/2017 | Hwang | H04L 5/00 |

OTHER PUBLICATIONS

CMCC: "Discussion on Procedure for 2-Step RACH", 3GPP Draft, R1-1906512, 3GPP TSG Ran WG1 #97, 3rd Generation Partnership Project (3GPP), Mobile Competence Centre, 650, Route Des Lucioles, F-06921, Sophia-Antipolis, Cedex, France, vol. RAN WG1, No. Reno, USA, May 13, 2019-May 17, 2019, May 13, 2019 (May 13, 2019), XP051727962, pp. 1-7, Retrieved from the Internet: URL:http://www.3gpp.org/ftp/Meetings%5F3GPP%5FSYNC/RAN1/Docs/R1%2D1906512%2Ezip [retrieved on May 13, 2019], Paragraph [02.3].
Intel Corporation: "Discussion on Channel Structure for 2-Step RACH", 3GPP Draft, R1-1906779, 3GPP TSG RAN WG1 #97, Intel Channel Structure, 3rd Generation Partnership Project (3GPP), Mobile Competence Centre, 650, Route Des Lucioles, F-06921, Sophia-Antipolis, Cedex, France, vol. RAN WG1, No. Reno, USA, May 13, 2019- May 17, 2019, May 4, 2019 (May 4, 2019), XP051708815, pp. 1-9, Retrieved from the Internet: URL:http://www.3gpp.org/ftp/tsg%5Fran/WG1%5FRL1/TSGR1%5F97/Docs/R1%2D1906779%2Ezip [retrieved on May 4, 2019], p. 3, paragraph 2.1—p. 5.
International Search Report and Written Opinion—PCT/US2020/039602—ISA/EPO—dated Sep. 30, 2020.
Qualcomm Incorporated: "Channel Structure for Two-Step RACH", 3GPP Draft, R1-1907691, 3GPP TSG-RAN WG1 Meeting #97, Channel Structure for Two-Step RACH, 3rd Generation Partnership Project (3GPP), Mobile competence Centre, 650, Route Des Lucioles, F-06921, Sophia-Antipolis, Cedex, France, vol. RAN WG1, No. Reno, USA, May 13, 2019-May 17, 2019, May 16, 2019 (May 16, 2019), XP051739977, pp. 1-20, Retrieved from the Internet: URL: http://www.3gpp.org/ftp/tsg%5Fran/WG1%5FRL1/TSGR1%5F97/Docs/R1%2D1907691%2Ezip [retrieved on May 16, 2019] figure 1 paragraph [02.1], paragraph [2.2.2], figure 6, p. 3, paragraphs 2.2, 2.2.2—p. 7.
Qualcomm Incorporated: "Procedures for Two-Step RACH", 3GPP Draft, R1-19103321, 3GPP TSG-RAN WG1 Meeting #96, Procedures for Two-Step RACH, 3rd Generation Partnership Project (3GPP), Mobile Competence Centre, 650, Route Des Lucioles, F-06921, Sophia-Antipolis, Cedex, France, vol. RAN WG1, No. Athens, Greece, Feb. 25, 2019-Mar. 1, 2019, Feb. 22, 2019 (Feb. 22, 2019), XP051600996, pp. 1-9, Retrieved from the Internet: URL: http://www.3gpp.org/ftp/tsg%5Fran/WG1%5FRL1/TSGR1%5F96/Docs/R1%2D1903321%2Ezip [retrieved on Feb. 22, 2019], p. 2-p. 41, Figure 1.

\* cited by examiner

FREQUENCY HOPPING FOR TWO-STEP RANDOM ACCESS

CROSS-REFERENCE TO RELATED APPLICATION

This Patent Application claims priority to Provisional Patent Application No. 62/878,579, filed on Jul. 25, 2019, entitled "FREQUENCY HOPPING FOR TWO-STEP RANDOM ACCESS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for frequency hopping for two-step random access.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station, configuration information for a two-step random access procedure; determining a frequency hopping space for transmitting a payload of a two-step random access channel of the two-step random access procedure; encoding the payload into one or more codewords; mapping the one or more codewords to a plurality of resource units of the frequency hopping space; and transmitting the one or more codewords to the base station on the plurality of resource units of the frequency hopping space.

In some aspects, a method of wireless communication, performed by a base station, may include transmitting, to a UE, configuration information indicating at least one of a frequency hopping space or a frequency hopping pattern for a payload of a two-step random access channel of a two-step random access procedure; and receiving the payload as one or more codewords on a plurality of resource units of the frequency hopping space in accordance with the configuration information.

In some aspects, a UE for wireless communication may include memory and one or more processors operatively coupled to the memory. The memory and the one or more processors may be configured to receive, from a base station, configuration information for a two-step random access procedure; determine a frequency hopping space for transmitting a payload of a two-step random access channel of the two-step random access procedure; encode the payload into one or more codewords; map the one or more codewords to a plurality of resource units of the frequency hopping space; and transmit the one or more codewords to the base station on the plurality of resource units of the frequency hopping space.

In some aspects, a base station for wireless communication may include memory and one or more processors operatively coupled to the memory. The memory and the one or more processors may be configured to transmit, to a UE, configuration information indicating at least one of a frequency hopping space or a frequency hopping pattern for a payload of a two-step random access channel of a two-step random access procedure; and receive the payload as one or more codewords on a plurality of resource units of the frequency hopping space in accordance with the configuration information.

In some aspects, a non-transitory computer-readable medium may store one or more instructions for wireless communication. The one or more instructions, when executed by one or more processors of a base station, may cause the one or more processors to: receive, from a base station, configuration information for a two-step random access procedure; determine a frequency hopping space for transmitting a payload of a two-step random access channel of the two-step random access procedure; encode the payload into one or more codewords; map the one or more codewords to a plurality of resource units of the frequency hopping space; and transmit the one or more codewords to the base station on the plurality of resource units of the frequency hopping space.

In some aspects, a non-transitory computer-readable medium may store one or more instructions for wireless communication. The one or more instructions, when executed by one or more processors of a base station, may cause the one or more processors to: transmit, to a UE, configuration information indicating at least one of a frequency hopping space or a frequency hopping pattern for a payload of a two-step random access channel of a two-step random access procedure; and receive the payload as one or more codewords on a plurality of resource units of the frequency hopping space in accordance with the configuration information.

In some aspects, an apparatus for wireless communication may include means for receiving, from a base station, configuration information for a two-step random access procedure; means for determining a frequency hopping space for transmitting a payload of a two-step random access channel of the two-step random access procedure; means for encoding the payload into one or more codewords; means for mapping the one or more codewords to a plurality of resource units of the frequency hopping space; and means for transmitting the one or more codewords to the base station on the plurality of resource units of the frequency hopping space.

In some aspects, an apparatus for wireless communication may include means for transmitting, to a UE, configuration information indicating at least one of a frequency hopping space or a frequency hopping pattern for a payload of a two-step random access channel of a two-step random access procedure; and means for receiving the payload as one or more codewords on a plurality of resource units of the frequency hopping space in accordance with the configuration information.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements").

These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
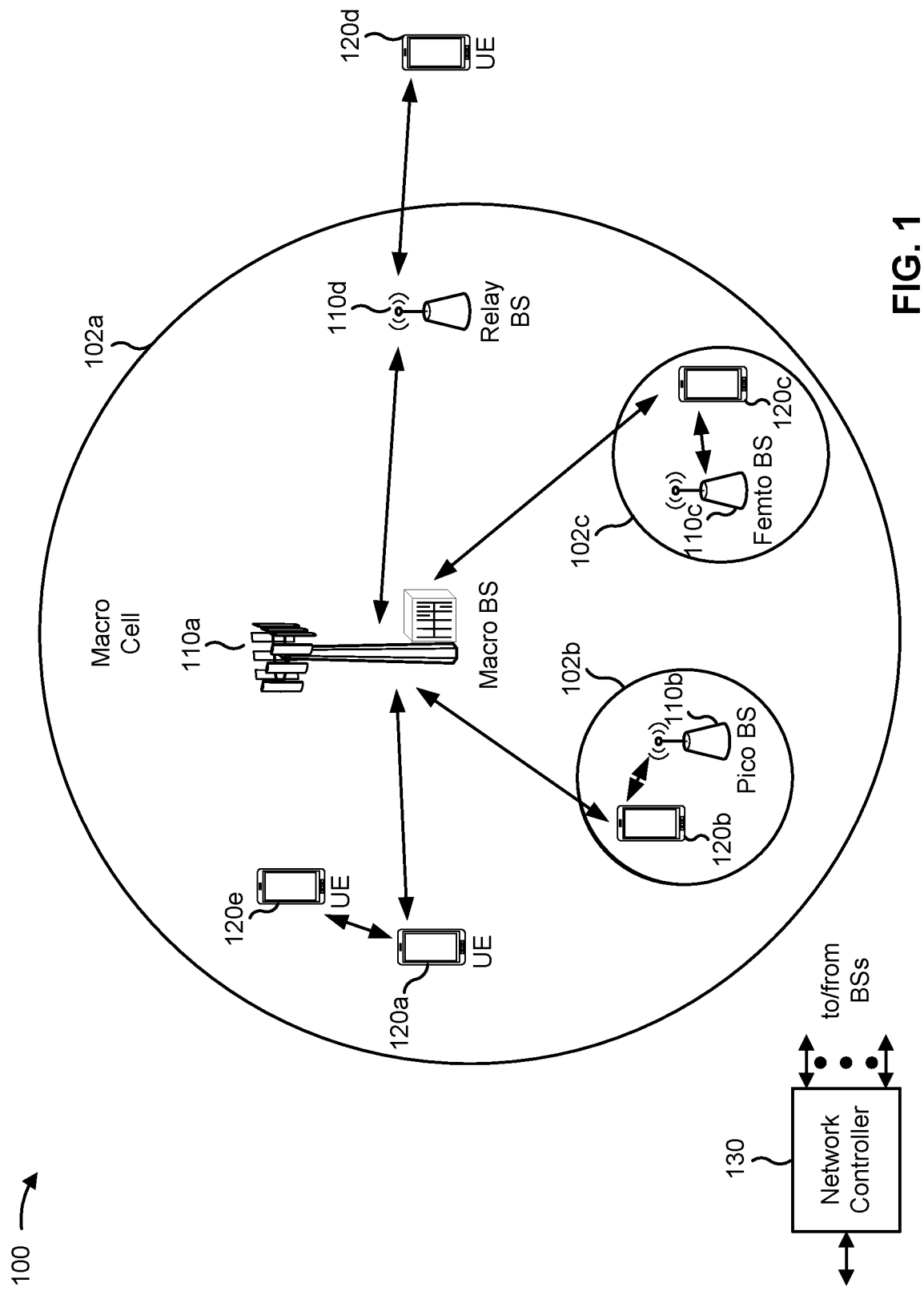
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TR", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
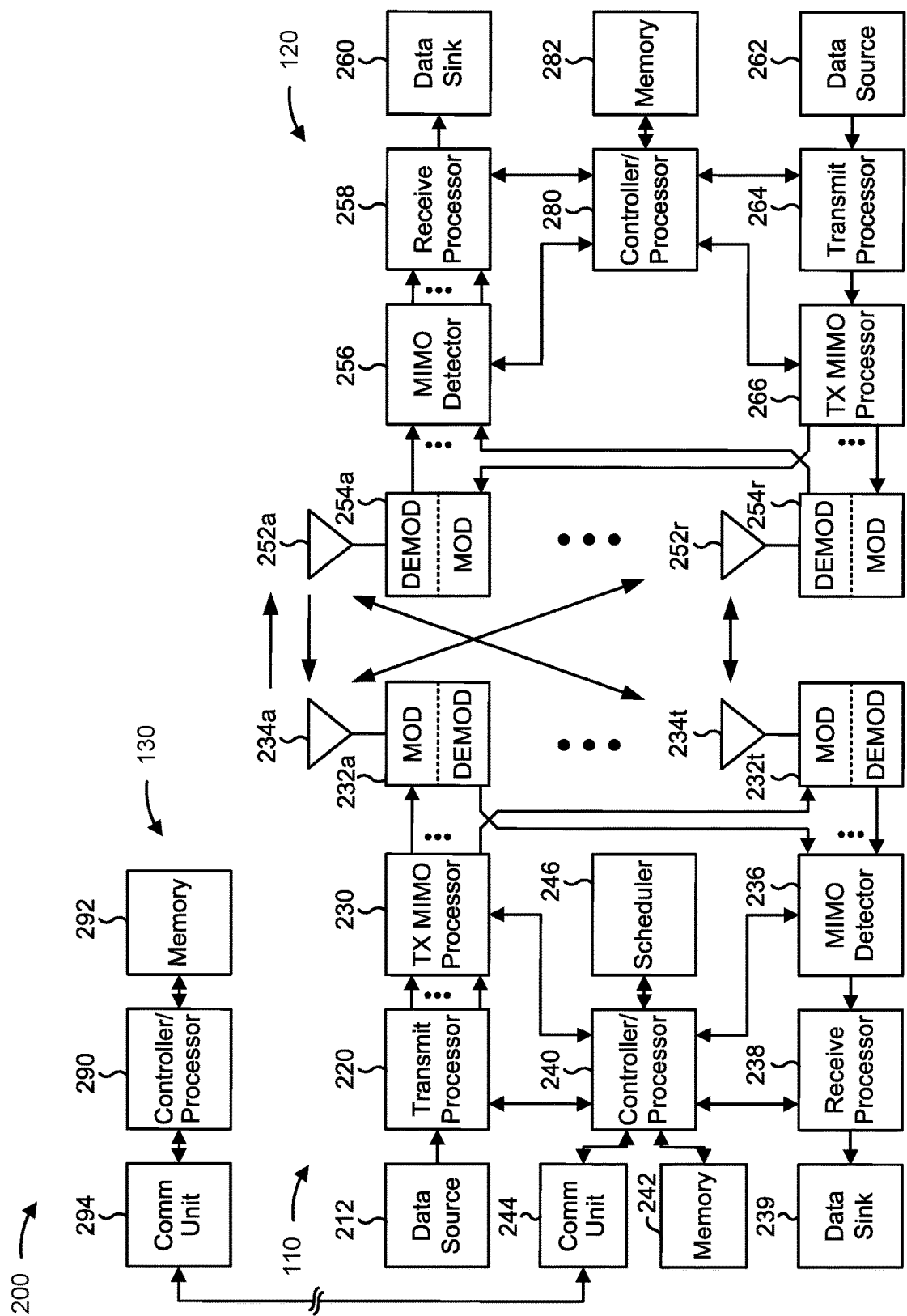
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with frequency hopping for two-step RACH, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving, from a base station, configuration information for a two-step random access procedure; means for determining a frequency hopping space for transmitting a payload of a two-step random access channel of the two-step random access procedure; means for encoding the payload into one or more codewords; means for mapping the one or more codewords to a plurality of resource units of the frequency hopping space; means for transmitting the one or more codewords to the base station on the plurality of resource units of the frequency hopping space; means for segmenting the payload into a plurality of blocks; means for encoding the plurality of blocks into respective codewords of the plurality of codewords; means for adding a respective cyclic redundancy check to each block of the plurality of blocks; means for receiving configuration information indicating the frequency hopping pattern; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a user equipment (UE), configuration information indicating at least one of a frequency hopping space or a frequency hopping pattern for a payload of a two-step random access channel of a two-step random access procedure; means for receiving the payload as one or more codewords on a plurality of resource units of the frequency hopping space in accordance with the configuration information; means for selecting, for the UE, at least one of: a resource unit size, or an aggregation level, wherein the frequency hopping space is based at least in part on the resource unit size or the aggregation level; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may synchronize with a BS on the uplink by performing a random access procedure. In a random access procedure, a UE and a BS may exchange information on random access channels (RACHs), and such information is referred to herein as RACH messages. One type of random access procedure is the four-step random access procedure, in which the UE transmits a preamble in a first message (Msg1), the BS responds to the preamble in a second message (Msg2) with a grant for a third message (Msg3), the UE transmits a payload in the third message, and the BS acknowledges the third message in a fourth message (Msg4). However, four-step random access may involve some unavoidable latency.

A two-step random access procedure may reduce latency and signaling overhead associated with initial access and data transfer relative to a four-step random access procedure. In the two-step random access procedure, the preamble and the payload may be combined into a first message (MsgA) and the downlink communications from the base station may be combined into a second message (MsgB). The two-step random access procedure may operate in any radio resource control (RRC) state (e.g., idle, inactive, or connected). In some aspects, two-step random access may be triggered by various events, such as initial access, RRC connection reestablishment, handover, uplink resynchronization, timing alignment, a request for system information, a beam failure recovery, and/or the like.

A two-step random access procedure may operate in a contention-based mode (e.g., a grant-free mode) or a contention-free mode (e.g., a grant-based mode), in which the uplink transmissions (e.g., MsgA) of multiple UEs can share radio resources in a non-orthogonal way. For example, one UE might use a particular time/frequency resource allocation for a RACH message, and another UE's RACH message may partially or completely overlap the particular time/frequency resource allocation. The UEs' RACH messages may be distinguished from each other using a signature, such as a random access identifier, a UE identifier, and/or the like.

Some techniques and apparatuses described herein provide techniques for frequency and time diversity of RACH message transmission. For example, some techniques and apparatuses described herein may provide frequency hopping configurations, hopping patterns, and/or retransmission schemes for transmission of a RACH payload within a frequency hopping space of a UE. Some techniques and apparatuses described herein provide configuration of a frequency hopping pattern, a frequency hopping space, a time/frequency grid for frequency hopping spaces of a UE, and/or the like. By performing frequency hopping within a UE's frequency hopping space, frequency diversity is improved and random access performance is improved. Furthermore, resource utilization of UEs performing random access is improved. Still further, uplink interference is reduced by providing frequency diversity among RACH transmissions of UEs.

Figure 3:
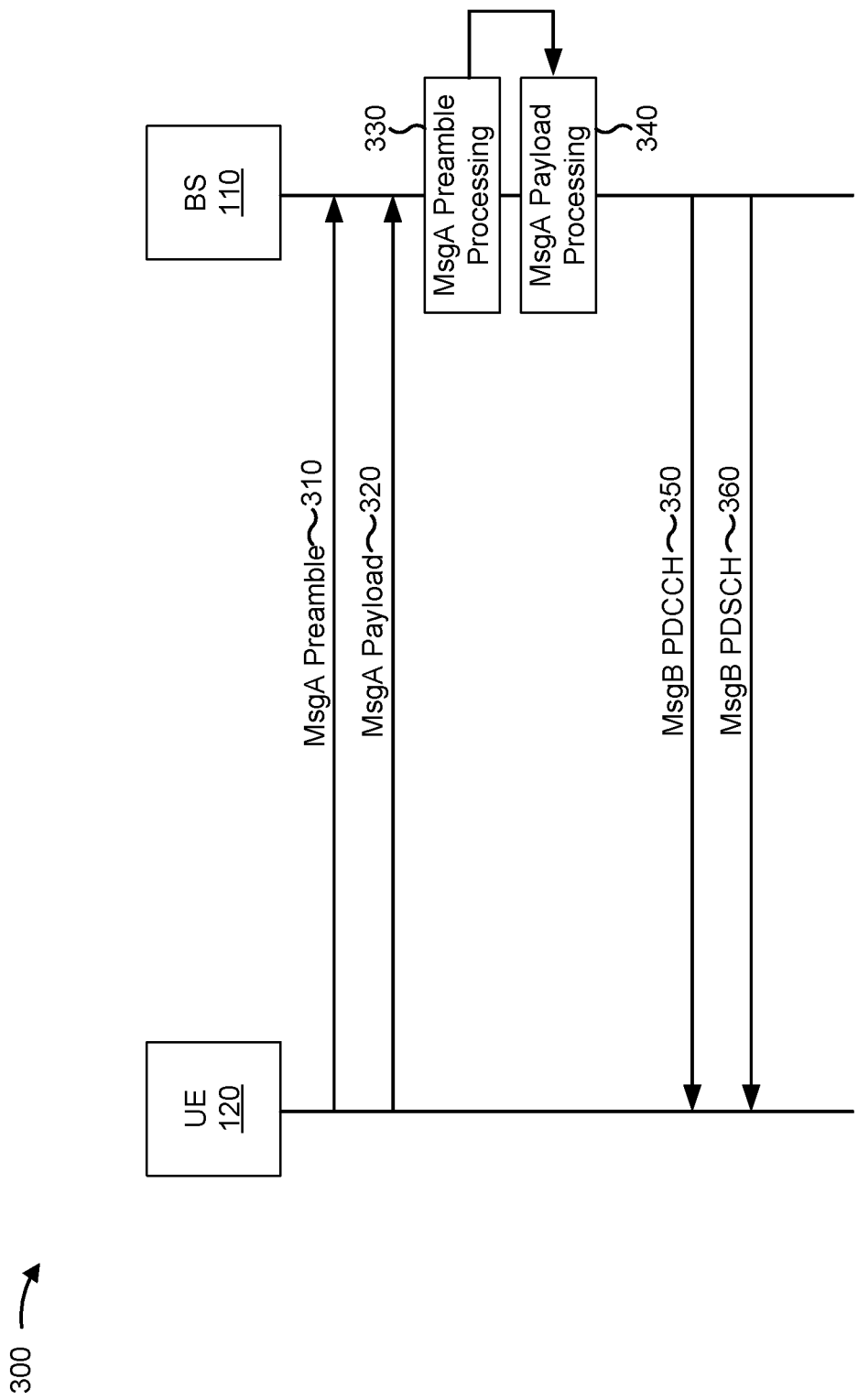
FIG. 3 is a diagram illustrating an example of a two-step random access channel (RACH) procedure, in accordance with various aspects of the present disclosure.

FIG. 3 is a diagram illustrating an example 300 of a two-step random access channel (RACH) procedure, in accordance with various aspects of the present disclosure. As shown, example 300 includes a UE 120 and a BS 110.

As shown by reference number 310, the UE 120 may transmit a MsgA preamble to the BS 110. For example, the MsgA preamble may be generated using a sequence or identifier associated with the UE 120, and may identify the UE 120 to the BS 110. As shown by reference number 320, the UE 120 may transmit a MsgA payload to the BS 110. The MsgA payload may include, for example, a demodulation reference signal (DMRS), a physical uplink shared channel (PUSCH), and/or the like. In some aspects, the UE 120 may perform frequency hopping for the MsgA payload by transmitting the payload on a resource selected in accordance with a frequency hopping pattern in a frequency hopping space, as described in more detail elsewhere herein.

As shown by reference number 330, the BS 110 may process the preamble. For example, the BS 110 may decode the preamble to identify the payload. As shown by reference number 340, the BS 110 may decode the payload. For example, the BS 110 may decode the PUSCH of the payload using the DMRS to determine the content of the PUSCH. In some aspects, the BS 110 may combine multiple retransmissions of the payload (e.g., in connection with a frequency hopping scheme) as described elsewhere herein.

As shown by reference number 350, the BS 110 may transmit a downlink control channel (e.g., a physical downlink control channel (PDCCH)) as part of a second RACH message (e.g., MsgB). For example, the downlink control channel may identify a resource allocation for a downlink shared channel. As shown by reference number 360, the BS 110 may transmit the downlink shared channel (e.g., a physical downlink shared channel (PDSCH) and/or the like) as part of the second RACH message. For example, the BS 110 may transmit the downlink shared channel on resources indicated by the downlink control channel.

As indicated above, FIG. 3 is provided as an example. Other examples may differ from what is described with respect to FIG. 3.

Figure 4:
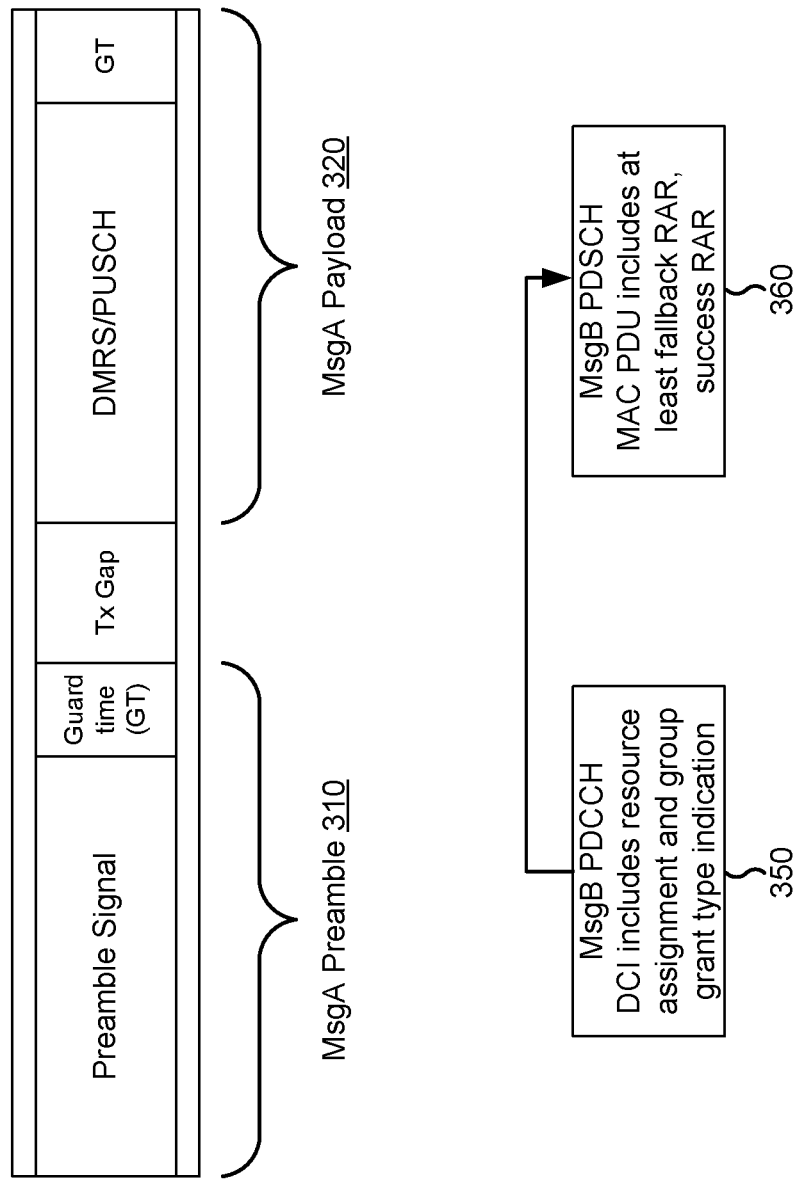
FIG. 4 is a diagram illustrating examples of messaging structures for RACH messages of a two-step RACH procedure, in accordance with various aspects of the present disclosure.

FIG. 4 is a diagram illustrating examples 400 of messaging structures for RACH messages of a two-step RACH procedure, in accordance with various aspects of the present disclosure. FIG. 4 shows additional detail regarding the MsgA preamble 310, the MsgA payload 320, the MsgB PDCCH 350, and the MsgB PDSCH 360.

As shown, the MsgA preamble 310 may include a preamble signal and a guard time (GT). The guard time may reduce interference between the MsgA preamble 310 and the MsgA payload 320. As further shown, a transmission (Tx) gap may be provided between the MsgA preamble 310 and the MsgA payload 320, which may provide for retuning from a frequency associated with the MsgA preamble 310 to a frequency associated with the MsgA payload 320. As shown, the MsgA payload 320 may include a DMRS, a PUSCH, and a guard time. In some aspects, the MsgA payload 320 may include, for example, uplink data, a medium access control (MAC) control element (CE), an uplink control information (UCI) piggybacking message, and/or the like. In some aspects, the MsgA payload 320 may be transmitted in accordance with a frequency hopping pattern, as described elsewhere herein.

As shown, the MsgB PDCCH 350 may include downlink control information (DCI). For example, the DCI may include a resource assignment, a group grant type indication, and/or the like. As shown, the MsgB PDSCH 360 may include a MAC protocol data unit (PDU). For example, the MsgB PDSCH 360 may include information indicating a resource for a fallback random access response (RAR) (e.g., for a fallback to four-step RACH), information indicating a resource for a successful RAR, and/or the like.

As indicated above, FIG. 4 is provided as an example. Other examples may differ from what is described with respect to FIG. 4.

Figure 5:
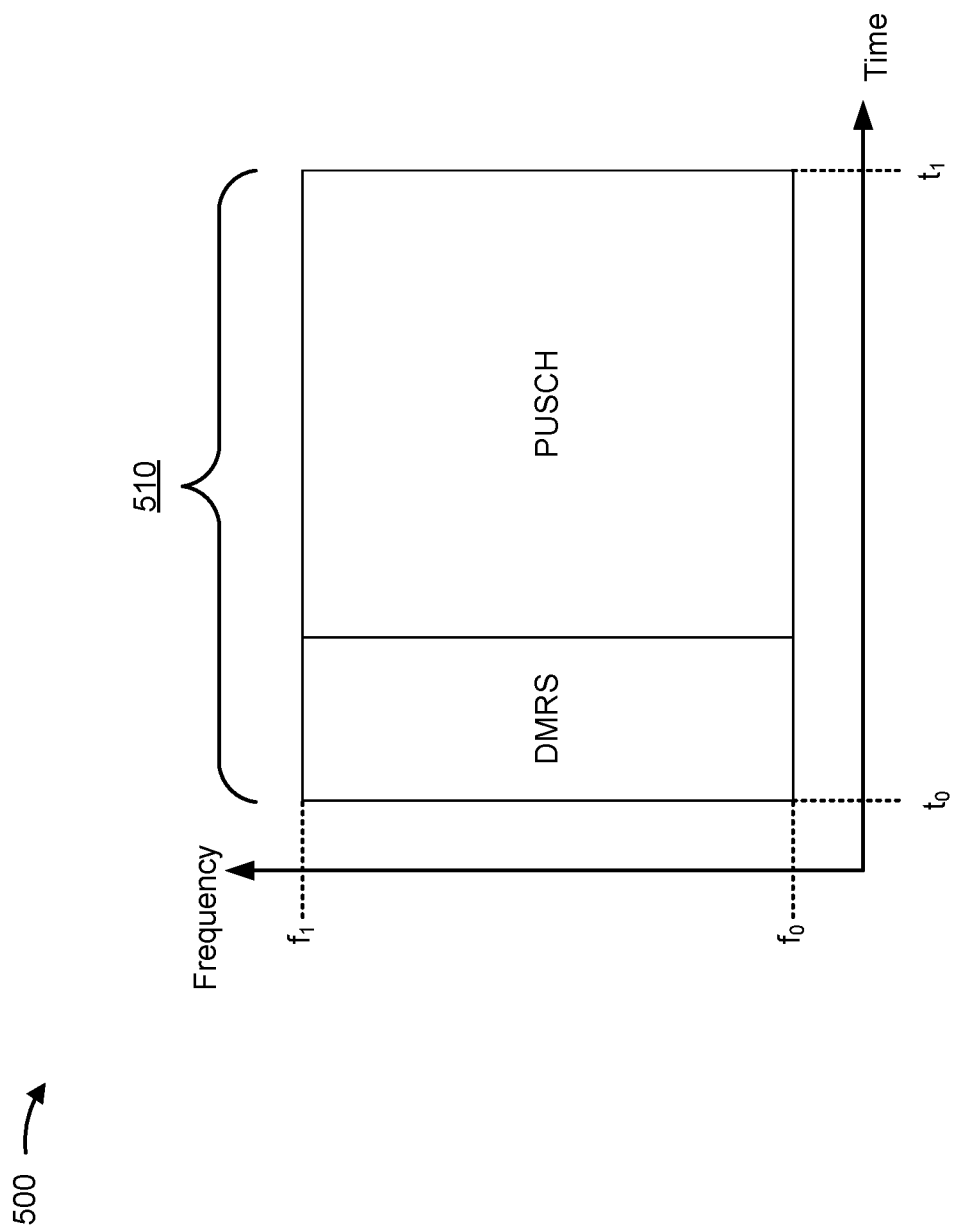
FIG. 5 is a diagram illustrating an example of a physical uplink shared channel (PUSCH) resource unit (PRU) of a two-step RACH procedure, in accordance with various aspects of the present disclosure.

FIG. 5 is a diagram illustrating an example 500 of a physical uplink shared channel (PUSCH) resource unit (PRU) of a two-step RACH procedure, in accordance with various aspects of the present disclosure. A PRU is sometimes referred to as a resource unit herein. A PRU may refer to the resource allocation used to transmit a MsgA payload, such as MsgA payload 320. The PRU is shown by reference number 510. As shown, the PRU for the MsgA payload may include a DMRS and a corresponding PUSCH.

As further shown, the PRU may be associated with parameters $f_0$, $f_1$, $t_0$, and $t_1$. $f_0$ may identify a lowest frequency value (e.g., a lowest physical resource block (PRB) or sub-PRB index and/or the like) of the PRU. $f_1$ may identify a highest frequency value (e.g., a highest PRB or sub-PRB index and/or the like) of the PRU. $t_0$ may identify a lowest time value (e.g., a lowest OFDM slot or symbol index and/or the like) of the PRU. $t_1$ may identify a highest time value (e.g., a highest OFDM slot or symbol index and/or the like) of the PRU. The dimensions of the PUSCH may be characterized by a size-4 array $D=[t_0\ f_0\ t_1\ f_1]$. In some aspects, $t_0(m)<t_1(m)$ for $1\leq m\leq M$. In some aspects, $f_0(m)<f_1(m)$, for $1\leq m\leq M$. In some aspects, $t_1(m)<t_0(m+1)$, $f$ or $1\leq m<M-1$, indicating that a non-zero guard time (e.g., guard period, transmission gap, or time gap) may be used between m and m+1 (since $t_1(m)$ is less than $t_0(m+1)$). The hopping may be performed within a slot (e.g., intra-slot) or between slots (e.g., inter-slot). For example, a payload may be split onto two or more PRUs in a single slot, or may be transmitted (e.g., repeated or split into two or more PRUs) across two or more slots.

Each PRU may include a set of DMRS resources and a set of PUSCH resources. A BS 110 may provide configuration information for a PRU. The configuration information may identify a DMRS resource set configuration and/or a PUSCH resource set configuration. The DMRS resource set configuration may indicate, for example, a number of DMRS symbols, a number of resource blocks (RBs) or sub-PRBs spanned by the DMRS, an index of an antenna port used to transmit the DMRS, a selection of a DMRS sequence (including an orthogonal cover code) and a mapping type, precoding or beamforming information, and/or the like. The PUSCH resource set configuration may indicate, for example, a number of PUSCH symbols, a number of RBs or sub-PRBs spanned by the PUSCH, precoding or beamforming information, a selection of a UE multiple access signature at the bit level or the resource element level, a selection of a cell-specific multiple access signature at the bit level or at the RE level, a guard time configuration for a guard time between hops, and/or the like. In some aspects, a multiple access signature may include, for example, a scrambling sequence, a spreading code, an interleaving pattern, and/or the like. The guard time configuration may be configurable in the time domain (e.g., based at least in part on a symbol duration of the guard period or guard time). The guard time configuration may be pseudo-random, provided by a table, or may be RRC-state-dependent. The PUSCH may be associated with a PUSCH occasion. The DMRS may hop with the PUSCH occasion since the DMRS is used to decode the PUSCH.

As indicated above, FIG. 5 is provided as an example. Other examples may differ from what is described with respect to FIG. 5.

Figure 6:
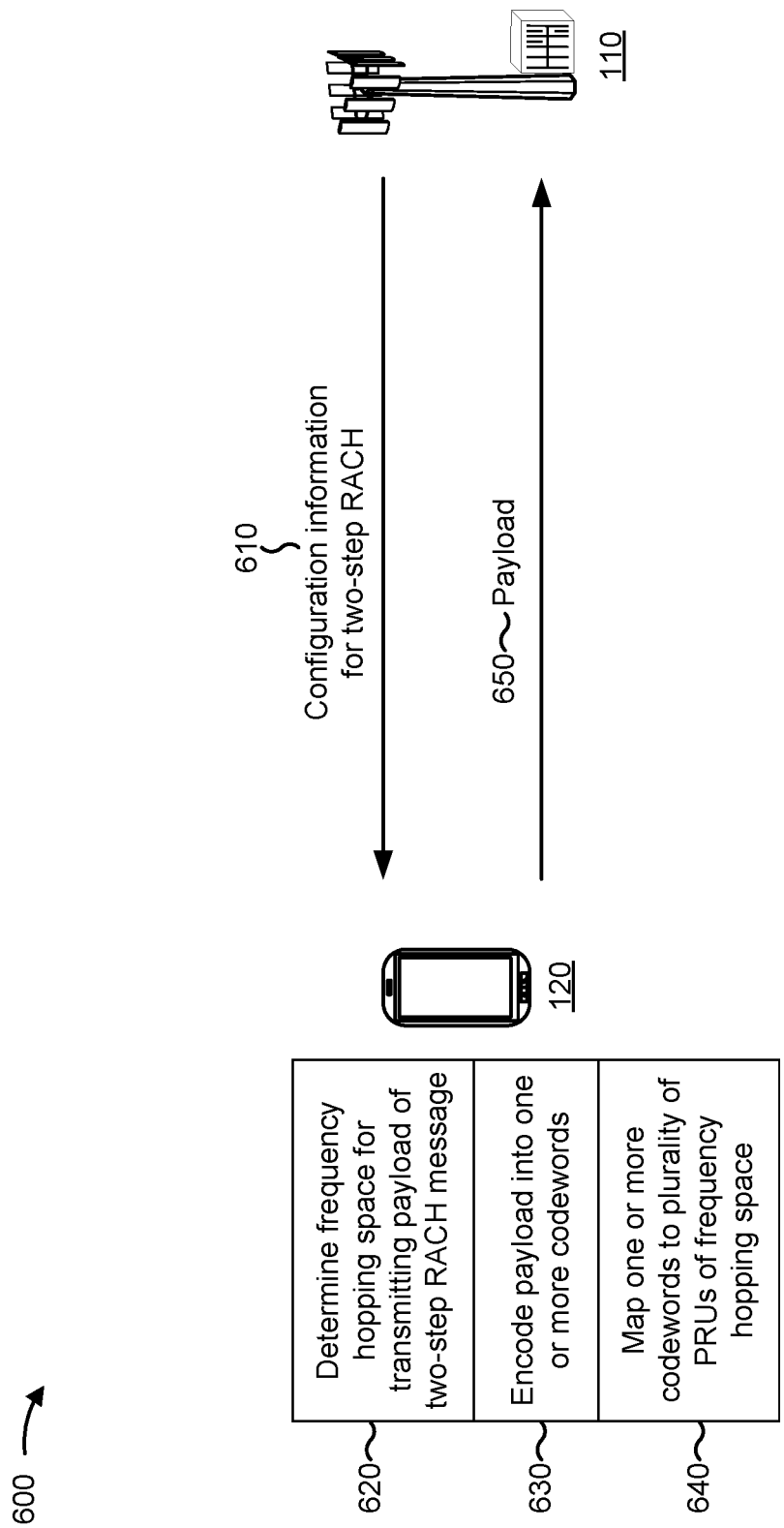
FIG. 6 is a diagram illustrating an example of frequency hopping for a two-step RACH procedure, in accordance with various aspects of the present disclosure.

FIG. 6 is a diagram illustrating an example 600 of frequency hopping for a two-step RACH procedure, in accordance with various aspects of the present disclosure. As shown, example 600 includes a UE 120 and a BS 110.

As shown by reference number 610, the BS 110 may transmit, to the UE 120, configuration information for a two-step RACH procedure. For example, the BS 110 may transmit configuration information that identifies a DMRS resource set configuration, a PUSCH resource set configuration, and/or the like. In some aspects, the configuration information may identify a configuration for a frequency hopping space. For example, multiple frequency hopping spaces may be configured for a UE 120 and/or a time/frequency grid. A frequency hopping space may be associated with a particular PRU resource size (e.g., based at least in part on $t_0$, $t_1$, $f_0$, and $f_1$ values of the frequency hopping space), a PRU aggregation level, an initial time/frequency location, a frequency hopping pattern, and/or the like. The configuration of the frequency hopping space is described in more detail elsewhere herein. In some aspects, the configuration information may identify a frequency hopping pattern for a UE 120, which is also described in more detail elsewhere herein. The configuration information may be provided using any form of signaling, such as system information (e.g., for a radio resource control (RRC) idle UE or an RRC inactive UE), downlink control information (e.g., for an RRC connected UE), a medium access control (MAC) control element (CE), a radio resource control (RRC) message (e.g., for an RRC connected UE), and/or the like. In some aspects, the configuration information may identify a guard time configuration for the frequency hopping pattern.

As shown by reference number 620, the UE 120 may determine a frequency hopping space for transmitting a payload of a two-step RACH message. For example, the UE 120 may select a frequency hopping space based at least in part on which to perform one or more transmissions of a payload of a two-step RACH message. In some aspects, the UE 120 may select the frequency hopping space from a plurality of frequency hopping spaces configured for the UE 120 and/or other UEs 120 as part of a time/frequency grid.

In some aspects, the UE 120 may select at least one of the frequency hopping space, a frequency hopping pattern, a resource unit size, or an aggregation level for the payload based at least in part on one or more factors. For example, the one or more factors may include a size of the payload, a coverage requirement associated with the UE 120, a redundancy version of the payload (e.g., an identifier of which retransmission of the payload is to be transmitted), a power class of the UE 120, a radio frequency (RF) capability of the UE 120, a bandwidth of the UE 120, and/or the like. For example, in the case of a grant-free transmission (e.g., a contention-free random access (CFRA) transmission), the UE 120 may select the frequency hopping space, the frequency hopping pattern, the resource unit size, or the aggregation level according to the above criteria. In some aspects, the UE 120 may receive information (e.g., configuration information, control information, and/or the like) indicating which frequency hopping space, frequency hopping pattern, resource unit size, or aggregation level is to be used. For example, in a grant-based RACH transmission, the BS 110 may provide this information to the UE 120.

As shown by reference number 630, the UE 120 may encode the payload into one or more codewords. For example, the UE 120 may generate one or more codewords using the payload. The UE 120 may transmit the one or more codewords using a frequency hopping pattern as described elsewhere herein. For example, if the UE 120 generates a single codeword, then the UE 120 may perform multiple transmissions of the single codeword in accordance with a frequency hopping pattern. If the UE 120 generates multiple codewords, then the UE 120 may transmit the multiple codewords in accordance with a frequency hopping pattern. Examples of techniques for generating codewords are described below. In some aspects, a frequency hopping pattern may be referred to herein as a hopping pattern, and/or a frequency hopping space may be referred to herein as a hopping space.

In some aspects, the UE 120 may encode the payload (e.g., with a cyclic redundancy check (CRC) attachment of the payload) into a length-N codeword C, wherein C includes [c(1), c(2), . . . , c(N)]. The UE 120 may map the codeword C to multiple, different PRUs. In some aspects, each PRU may have a same time/frequency resource size, and may carry a repetition of the codeword C. In some aspects, one or more PRUs may have a different time/frequency resource size and/or may carry information other than the repetition of the codeword C.

In some aspects, the UE 120 may generate codewords using different modulation and coding schemes (MCSs), rate matching configurations, redundancy versions, and/or the like. For example, in a case where the payload is to be mapped to M PRUs, the UE 120 may encode the payload into a length $N_m$ codeword $C_m$, wherein $C_m$ includes [c(1), c(2), . . . c($N_m$)], wherein m=1, 2, . . . , M, and wherein M>1. The MCS, rate matching configuration, and/or redundancy version can be the same for different codewords $C_m$ or can be different for different codewords $C_m$. The UE 120 may map each codeword $C_m$ to a PRU m, wherein m=1, 2, . . . , M and M>1. In this case, the time/frequency resource size of the M PRUs can be similar or equal to each other, or can be different from each other.

In some aspects, the UE 120 may segment the payload (e.g., with the CRC attachment of the payload) into M blocks, wherein M>1. In this case, the segmentation may be non-overlapping or partially overlapping. When the segmentation is partially overlapping, the overlapped bits may be encoded in multiple code blocks. For example, assuming a payload of 123456 for simplicity, and assuming three partially overlapped segments, the UE 120 may segment the payload into blocks of 1234, 2345, and 3456, into blocks of 123, 234, and 456, or into a different combination of blocks. This may improve error protection for the overlapped bits. The UE 120 may add a CRC to each block, and may encode the blocks into M codewords $B_m$, wherein Bm=[b(1), b(2), . . . b($N_m$)], wherein m=1, 2, . . . , M and M>1. In this case, the UE 120 may map a code block or codeword $B_m$ to PRU m. The MCS and rate matching scheme for Bm can be identical or can be different for different values of m. Furthermore, the time/frequency resource size of the M PRUs can be equal for all of the M PRUs, or can be different for two or more of the M PRUs.

As shown by reference number 640, the UE 120 may map the one or more codewords to a plurality of PRUs of the selected frequency hopping space. For example, the UE 120 may map the codewords to the plurality of PRUs as described above in connection with reference number 630. In some aspects, the UE 120 may map the one or more codewords to the plurality of PRUs based at least in part on a frequency hopping pattern.

In some aspects, a frequency hopping pattern may be cell-specific. For example, the frequency hopping pattern may be based at least in part on a cell identifier associated with a cell, which may cause hopping patterns on different cells to differ from each other, thereby randomizing inter-cell interference. In some aspects, a frequency hopping pattern may be UE-specific. For example, the frequency hopping pattern may be based at least in part on information associated with a UE, such as a UE identifier and/or the like, which may cause hopping patterns associated with different UEs to differ from each other, thereby randomizing intra-cell interference.

In some aspects, a frequency hopping pattern may be based at least in part on a hash function. For example, a frequency hopping pattern (e.g., a UE-specific hopping pattern or another type of hopping pattern) for the m-th PRU hop may be represented by a hash function for $f_0(m)$: $f_0(m+1) = [\alpha_M(m) + A_M (m)f_0(m)] \bmod D_M(m), 1 \leq m \leq M$, where $\alpha_M(m)$, $A_M(m)$, and $D_M(m)$ can be configured as a function of a cell identifier, a UE identifier (e.g., a preamble identifier and/or the like), an aggregation level M, a hop index m, and/or the like.

In some aspects, a frequency hopping pattern may include a change in a hopping pattern direction of the frequency hopping pattern. For example, a frequency hopping pattern for the m-th PRU hop may be represented by a function for $f_0(m)$: $f_0(m+1) = [f_0(m) + F_M(m) \times (-1)^{(m+1) \bmod K_M(m)}] \bmod D_M(m)$, $1 \leq m \leq M$, where $F_M(m)$, $K_M(m)$, and $D_M(m)$ can be configured as a function of cell identifier, UE identifier (such as a preamble identifier), aggregation level M, and hop index m.

In some aspects, a frequency hopping pattern may be based at least in part on a virtual resource block to physical resource block (VRB-to-PRB) mapping and/or may follow an interleaving pattern. For example, the frequency hopping pattern may follow a VRB-to-PRB mapping rule defined by a specification, such as a 3GPP Technical Specification (TS) (e.g., 3GPP TS 38.211 at Clause 7.3.1.6) and/or the like.

In some aspects, the UE 120 may determine a scrambling identifier for a PRU hop. For example, the scrambling identifiers for a DMRS and/or a PUSCH on a hop may be based at least in part on a cell identifier of the UE 120, a UE identifier of the UE 120, a hop index of a hopping pattern of the UE 120, and/or the like. This may reduce intra-cell interference and inter-cell interference of the UE 120.

As shown by reference number 650, the UE 120 may transmit the payload on the plurality of PRUs of the frequency hopping space. For example, the UE 120 may transmit the payload on the plurality of PRUs in accordance with the mapping described in connection with reference numbers 630 and 640. Thus, the UE 120 may improve frequency diversity of the preamble, reduce collision between UEs using grant-free RACH procedures, and improve utilization of radio resources.

As indicated above, FIG. 6 is provided as an example. Other examples may differ from what is described with respect to FIG. 6.

Figure 7:
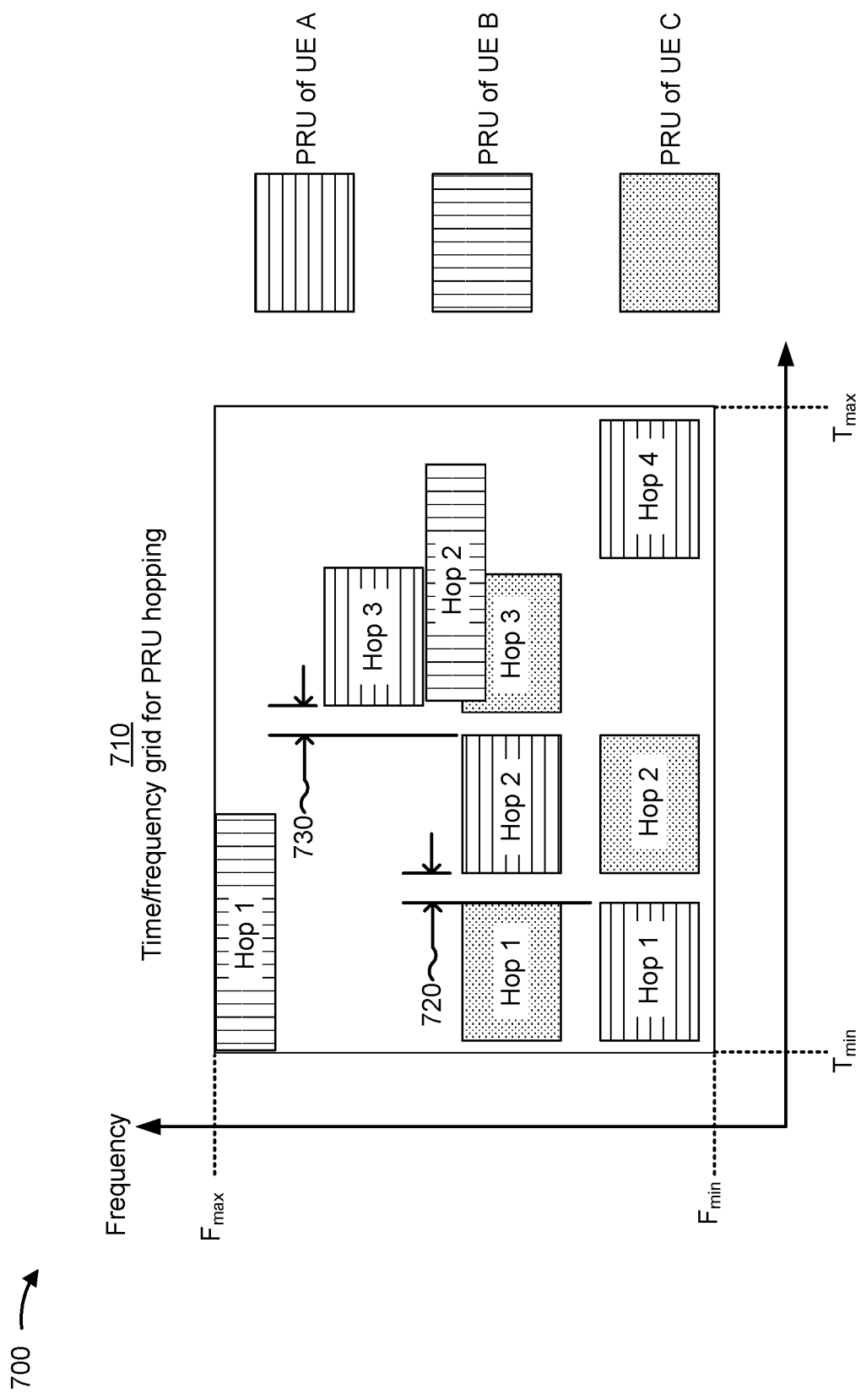
FIG. 7 is a diagram illustrating an example of a time/frequency grid for frequency hopping for a two-step RACH procedure, in accordance with various aspects of the present disclosure.

FIG. 7 is a diagram illustrating an example 700 of a time/frequency grid for frequency hopping for a two-step RACH procedure, in accordance with various aspects of the present disclosure. As shown, example 700 includes a time/frequency grid 710. The time/frequency grid is bounded by frequency values $F_{max}$ and $F_{min}$ and time values $T_{max}$ and $T_{min}$. $F_{max}$ and $F_{min}$ may identify a maximum and a minimum PRB or sub-PRB index of the time/frequency grid, and $T_{max}$ and $T_{min}$ may identify a maximum and a minimum OFDM slot or symbol index of the time/frequency grid. The dimensions of the time/frequency grid may be indicated to the UE 120 as part of configuration information, for example, using system information, radio resource control signaling, and/or the like.

Example 700 shows PRUs associated with three UEs: UE A, UE B, and UE C. Each UE may transmit multiple PRUs according to the operations described above in connection with FIG. 6. The number of PRUs transmitted by a UE in the time/frequency grid may be referred to as an aggregation level of the UE. Within a cell, the configurations for PRU size and aggregation level may be different for different UEs, and may be based at least in part on a size of the payload, an uplink coverage requirement, a redundancy version, a bandwidth of the UE, and/or the like.

Each UE may map codewords to PRUs based at least in part on a frequency hopping pattern associated with a frequency hopping space. It can be seen that different UEs can use different frequency hopping patterns, aggregation levels, and/or the like. For example, a UE-specific frequency hopping space may be identified using an initial time/frequency location in the time/frequency grid, a frequency hopping pattern, a PRU size, and a PRU aggregation level.

In some aspects, if PRUs of two UEs overlap each other, as with Hop 2 of UE B and Hop 3 of UE C, the BS 110 may disregard or drop the overlapped PRUs, may combine the overlapped PRUs with other PRUs corresponding to the UEs that transmitted the PRUs, may cause retransmission of the overlapped PRUs, and/or the like.

Each UE (e.g., UE A, UE B, and UE C) is associated with a respective guard time between hops for the corresponding hopping pattern. UE A's guard times are shown by reference number 720 (between Hop 1 and Hop 2) and reference number 730 (between Hop 2 and Hop 3). These guard times may be configured in association with the corresponding frequency hopping pattern, as described in more detail elsewhere herein.

As indicated above, FIG. 7 is provided as an example. Other examples may differ from what is described with respect to FIG. 7.

Figure 8:
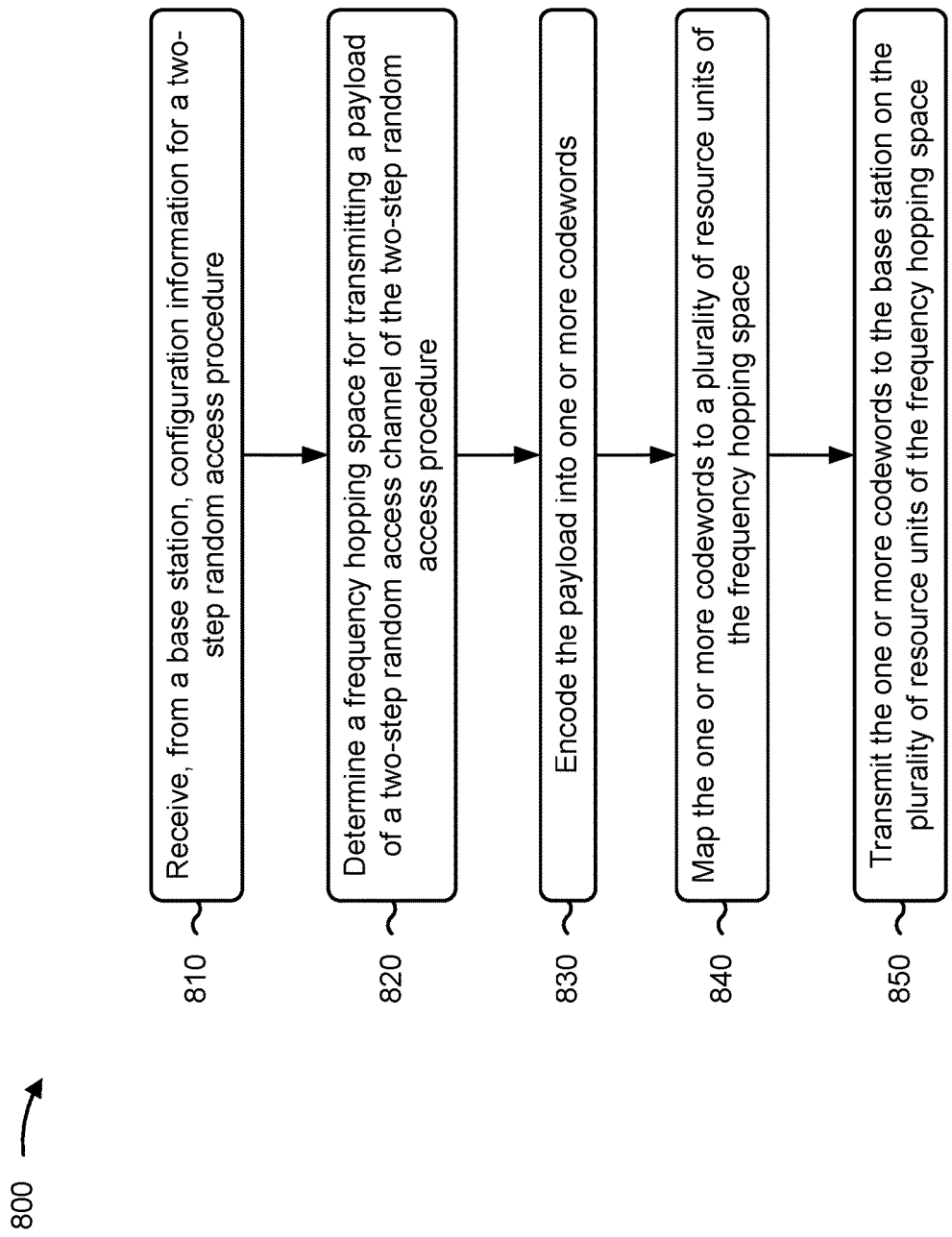
FIG. 8 is a diagram illustrating an example process performed, for example, by a user equipment, in accordance with various aspects of the present disclosure.

FIG. 8 is a diagram illustrating an example process 800 performed, for example, by a user equipment, in accordance with various aspects of the present disclosure. Example process 800 is an example where a UE (e.g., UE 120 and/or the like) performs operations associated with frequency hopping for two-step random access.

As shown in FIG. 8, in some aspects, process 800 may include receiving, from a base station, configuration information for a two-step random access procedure (block 810). For example, the UE (e.g., using antenna 252, DEMOD 254, MIMO detector 256, receive processor 258, controller/processor 280, and/or the like) may receive, from a base station (e.g., BS 110 and/or the like), configuration information for a two-step random access procedure, as described above.

As further shown in FIG. 8, in some aspects, process 800 may include determining a frequency hopping space for transmitting a payload of a two-step random access channel of the two-step random access procedure (block 820). For example, the user equipment (e.g., using receive processor 258, transmit processor 264, controller/processor 280, memory 282, and/or the like) may determine a frequency hopping space for transmitting a payload of a two-step random access channel of the two-step random access procedure, as described above. The payload may be referred to herein as a two-step RACH payload, a MsgA payload (e.g., MsgA payload 320), and/or the like. The two-step random access channel may refer to MsgA.

As further shown in FIG. 8, in some aspects, process 800 may include encoding the payload into one or more codewords (block 830). For example, the UE (e.g., using controller/processor 280, transmit processor 264, TX MIMO processor 266, MOD 254, antenna 252, and/or the like) may encode the payload into one or more codewords, as described above.

As further shown in FIG. 8, in some aspects, process 800 may include mapping the one or more codewords to a plurality of resource units of the frequency hopping space (block 840). For example, the UE (e.g., using controller/processor 280, transmit processor 264, TX MIMO processor 266, MOD 254, antenna 252, and/or the like) may map the one or more codewords to a plurality of resource units of the frequency hopping space, as described above.

As further shown in FIG. 8, in some aspects, process 800 may include transmitting the one or more codewords to the base station on the plurality of resource units of the frequency hopping space (block 850). For example, the UE (e.g., using controller/processor 280, transmit processor 264, TX MIMO processor 266, MOD 254, antenna 252, and/or the like) may transmit the one or more codewords to the base station on the plurality of resource units of the frequency hopping space, as described above.

Process 800 may include additional aspects, such as any single aspect or any combination of aspects described below and/or in connection with one or more other processes described elsewhere herein.

In a first aspect, the one or more codewords comprise a plurality of repetitions of a codeword, wherein the plurality of repetitions of the codeword are mapped to respective resource units of the frequency hopping space.

In a second aspect, alone or in combination with the first aspect, each repetition, of the plurality of repetitions of the codeword, is associated with a same resource size and a same configuration.

In a third aspect, alone or in combination with one or more of the first and second aspects, the same configuration comprises at least one of: a modulation and coding scheme, a rate matching scheme, or a redundancy version.

In a fourth aspect, alone or in combination with one or more of the first through third aspects, two or more repetitions, of the plurality of repetitions of the codeword, are associated with at least one of: different modulation and coding schemes, different rate matching schemes, or different redundancy versions.

In a fifth aspect, alone or in combination with one or more of the first through fourth aspects, the one or more codewords are a plurality of codewords. In some aspects, encoding the payload into the plurality of codewords further comprises: segmenting the payload into a plurality of blocks; and encoding the plurality of blocks into respective codewords of the plurality of codewords.

In a sixth aspect, alone or in combination with one or more of the first through fifth aspects, the plurality of blocks are non-overlapped blocks.

In a seventh aspect, alone or in combination with one or more of the first through sixth aspects, the plurality of blocks are at least partially overlapped blocks.

In an eighth aspect, alone or in combination with one or more of the first through seventh aspects, the method further comprises adding a respective cyclic redundancy check to each block of the plurality of blocks.

In a ninth aspect, alone or in combination with one or more of the first through eighth aspects, each codeword, of the plurality of codewords, is associated with a same resource size and a same configuration.

In a tenth aspect, alone or in combination with one or more of the first through ninth aspects, the same configuration comprises at least one of: a modulation and coding scheme, a rate matching scheme, or a redundancy version.

In an eleventh aspect, alone or in combination with one or more of the first through tenth aspects, two or more codewords, of the plurality of codewords, are associated with at least one of: different modulation and coding schemes, different rate matching schemes, different resource sizes, or different redundancy versions.

In a twelfth aspect, alone or in combination with one or more of the first through eleventh aspects, the configuration information indicates a common time/frequency resource grid for payloads of a plurality of UEs.

In a thirteenth aspect, alone or in combination with one or more of the first through twelfth aspects, the configuration information indicates a plurality of frequency hopping spaces associated with the common time/frequency resource grid.

In a fourteenth aspect, alone or in combination with one or more of the first through thirteenth aspects, the configuration information identifies at least one of: a resource unit size associated with the frequency hopping space, an aggregation level associated with the frequency hopping space, a time location of the frequency hopping space, a frequency location of the frequency hopping space, or a frequency hopping pattern of the frequency hopping space.

In a fifteenth aspect, alone or in combination with one or more of the first through fourteenth aspects, the method further comprises selecting at least one of a resource unit size for the payload, an aggregation level for the payload, or the frequency hopping pattern based at least in part on at least one of: a size of the payload, a coverage requirement associated with the UE, a redundancy version of the payload, a power class of the UE, a radio frequency (RF) capability of the UE, or a bandwidth of the UE.

In a sixteenth aspect, alone or in combination with one or more of the first through fifteenth aspects, mapping the one or more codewords to the plurality of resource units of the frequency hopping space is based at least in part on a frequency hopping pattern.

In a seventeenth aspect, alone or in combination with one or more of the first through sixteenth aspects, the method may include receiving configuration information indicating the frequency hopping pattern.

In an eighteenth aspect, alone or in combination with one or more of the first through seventeenth aspects, the configuration information indicates a guard time configuration for the frequency hopping pattern In a nineteenth aspect, alone or in combination with one or more of the first through eighteenth aspects, the frequency hopping pattern is based at least in part on a hash function.

In a twentieth aspect, alone or in combination with one or more of the first through nineteenth aspects, the frequency hopping pattern includes a change in a hopping direction of the frequency hopping pattern.

In a twenty-first aspect, alone or in combination with one or more of the first through twentieth aspects, the frequency hopping pattern is based at least in part on a virtual resource block to physical resource block mapping pattern.

In a twenty-second aspect, alone or in combination with one or more of the first through twenty-first aspects, mapping the one or more codewords to a plurality of resource units of the frequency hopping space comprises mapping the one or more codewords in accordance with a guard period configuration of the frequency hopping pattern.

In a twenty-third aspect, alone or in combination with one or more of the first through twenty-second aspects, respective scrambling identifiers of the plurality of resource units are based at least in part on at least one of: a cell identifier, a UE identifier of the UE, or a hop index of a frequency hopping pattern adopted by the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
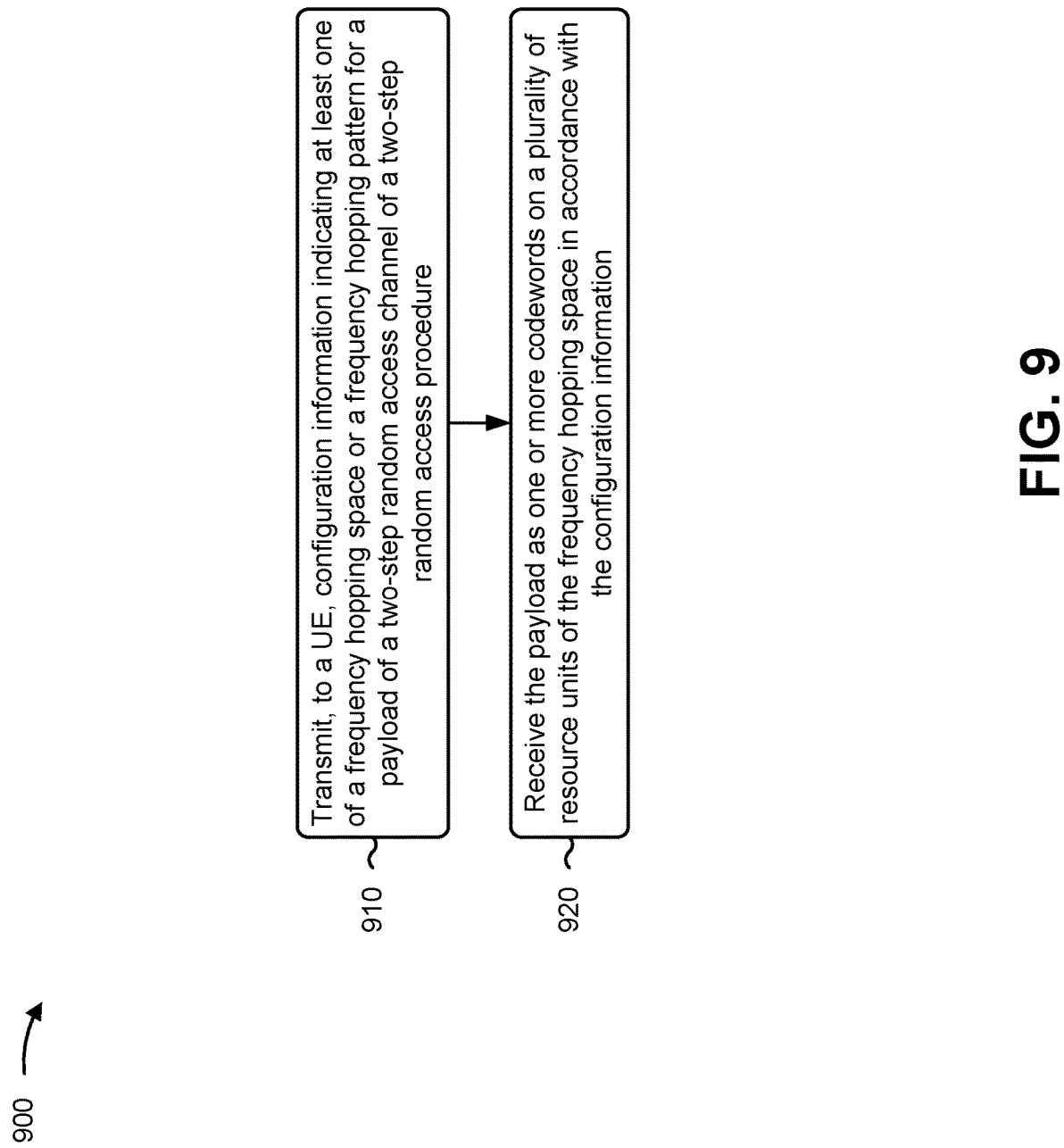
FIG. 9 is a diagram illustrating an example process performed, for example, by a base station, in accordance with various aspects of the present disclosure.

FIG. 9 is a diagram illustrating an example process 900 performed, for example, by a base station, in accordance with various aspects of the present disclosure. Example process 900 is an example where a base station (e.g., base station 110 and/or the like) performs operations associated with frequency hopping for two-step random access.

As shown in FIG. 9, in some aspects, process 900 may include transmitting, to a UE, configuration information indicating at least one of a frequency hopping space or a frequency hopping pattern for a payload of a two-step random access channel of a two-step random access procedure (block 910). For example, the base station (e.g., using controller/processor 240, transmit processor 220, TX MIMO processor 230, MOD 232, antenna 234, and/or the like) may transmit, to a UE (e.g., UE 120 and/or the like), configuration information indicating at least one of a frequency hopping space or a frequency hopping pattern for a payload of a two-step random access channel of a two-step random access procedure, as described above.

As further shown in FIG. 9, in some aspects, process 900 may include receiving the payload as one or more codewords on a plurality of resource units of the frequency hopping space in accordance with the configuration information (block 920). For example, the base station (e.g., using antenna 234, DEMOD 232, MIMO detector 236, receive processor 238, controller/processor 240, and/or the like) may receive the payload as one or more codewords on a plurality of resource units of the frequency hopping space in accordance with the configuration information, as described above.

Process 900 may include additional aspects, such as any single aspect or any combination of aspects described below and/or in connection with one or more other processes described elsewhere herein.

In a first aspect, the one or more codewords comprise a plurality of repetitions of a codeword, wherein the plurality of repetitions of the codeword are mapped to respective resource units of the frequency hopping space.

In a second aspect, alone or in combination with the first aspect, each repetition, of the plurality of repetitions of the codeword, is associated with a same resource size and a same configuration.

In a third aspect, alone or in combination with one or more of the first and second aspects, the same configuration comprises at least one of: a modulation and coding scheme, a rate matching scheme, or a redundancy version.

In a fourth aspect, alone or in combination with one or more of the first through third aspects, two or more repetitions, of the plurality of repetitions of the codeword, are associated with at least one of: different modulation and coding schemes, different rate matching schemes, or different redundancy versions.

In a fifth aspect, alone or in combination with one or more of the first through fourth aspects, the one or more codewords are a plurality of codewords corresponding to respective blocks of a plurality of blocks of the payload.

In a sixth aspect, alone or in combination with one or more of the first through fifth aspects, the plurality of blocks are non-overlapped blocks.

In a seventh aspect, alone or in combination with one or more of the first through sixth aspects, the plurality of blocks are at least partially overlapped blocks.

In an eighth aspect, alone or in combination with one or more of the first through seventh aspects, each block of the plurality of blocks is associated with a respective cyclic redundancy check.

In a ninth aspect, alone or in combination with one or more of the first through eighth aspects, each codeword, of the plurality of codewords, is associated with a same resource size and a same configuration.

In a tenth aspect, alone or in combination with one or more of the first through ninth aspects, the same configuration comprises at least one of: a modulation and coding scheme, a rate matching scheme, or a redundancy version.

In an eleventh aspect, alone or in combination with one or more of the first through tenth aspects, two or more codewords, of the plurality of codewords, are associated with at least one of: different modulation and coding schemes, different rate matching schemes, different resource sizes, or different redundancy versions.

In a twelfth aspect, alone or in combination with one or more of the first through eleventh aspects, the configuration information indicates a plurality of frequency hopping spaces including the frequency hopping space.

In a thirteenth aspect, alone or in combination with one or more of the first through twelfth aspects, the frequency hopping space is associated with a common time/frequency grid for payloads of a plurality of UEs.

In a fourteenth aspect, alone or in combination with one or more of the first through thirteenth aspects, the configuration information identifies at least one of: a resource unit size associated with the frequency hopping space, an aggregation level associated with the frequency hopping space, a time location of the frequency hopping space, a frequency location of the frequency hopping space, a guard time associated with the frequency hopping pattern, or a frequency hopping pattern of the frequency hopping space.

In a fifteenth aspect, alone or in combination with one or more of the first through fourteenth aspects, the method further comprises selecting, for the UE, at least one of: a resource unit size, or an aggregation level, wherein the frequency hopping space is based at least in part on the resource unit size or the aggregation level.

In a sixteenth aspect, alone or in combination with one or more of the first through fifteenth aspects, selecting at least one of the resource unit size or the aggregation level or the frequency hopping pattern is based at least in part on at least one of: a size of the payload, a coverage requirement associated with the UE, a redundancy version of the payload, a power class of the UE, a radio frequency capability of the UE, or a bandwidth of the UE.

In a seventeenth aspect, alone or in combination with one or more of the first through sixteenth aspects, the frequency hopping pattern is based at least in part on a hash function.

In an eighteenth aspect, alone or in combination with one or more of the first through seventeenth aspects, the frequency hopping pattern includes a change in a hopping direction of the frequency hopping pattern.

In a nineteenth aspect, alone or in combination with one or more of the first through eighteenth aspects, the frequency hopping pattern is based at least in part on a virtual resource block to physical resource block mapping pattern.

In a twentieth aspect, alone or in combination with one or more of the first through nineteenth aspects, respective scrambling identifiers of the plurality of resource units are based at least in part on at least one of: a cell identifier of the UE, a UE identifier of the UE, or a hop index of a frequency hopping pattern adopted by the UE.

In a twenty-first aspect, alone or in combination with one or more of the first through twentieth aspects, the configuration information is signaled using at least one of: system information, radio resource control information, or downlink control information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station, configuration information for a two-step random access procedure;
   determining a frequency hopping space for transmitting a payload of a two-step random access channel of the two-step random access procedure;
   encoding the payload into one or more codewords;
   mapping the one or more codewords to a plurality of resource units of the frequency hopping space; and
   transmitting, during a first step of the two-step random access procedure, the one or more codewords to the base station on the plurality of resource units of the frequency hopping space.

2. The method of claim 1, wherein the one or more codewords comprise a plurality of repetitions of a codeword, and wherein the plurality of repetitions of the codeword are mapped to respective resource units of the frequency hopping space.

3. The method of claim 2, wherein each repetition, of the plurality of repetitions of the codeword, is associated with a same resource size and a same configuration.

4. The method of claim 3, wherein the same configuration comprises at least one of:
   a modulation and coding scheme,
   a rate matching scheme, or
   a redundancy version.

5. The method of claim 2, wherein two or more repetitions, of the plurality of repetitions of the codeword, are associated with at least one of:
   different modulation and coding schemes,
   different rate matching schemes, or
   different redundancy versions.

6. The method of claim 1, wherein the one or more codewords are a plurality of codewords, and wherein encoding the payload into the plurality of codewords further comprises:
   segmenting the payload into a plurality of blocks; and
   encoding the plurality of blocks into respective codewords of the plurality of codewords.

7. The method of claim 6, wherein the plurality of blocks are non-overlapped blocks.

8. The method of claim 6, wherein the plurality of blocks are at least partially overlapped blocks.

9. The method of claim 6, further comprising:
   adding a respective cyclic redundancy check to each block of the plurality of blocks.

10. The method of claim 6, wherein each codeword, of the plurality of codewords, is associated with a same resource size and a same configuration.

11. The method of claim 10, wherein the same configuration comprises at least one of:
    a modulation and coding scheme,
    a rate matching scheme, or
    a redundancy version.

12. The method of claim 6, wherein two or more codewords, of the plurality of codewords, are associated with at least one of:
    different modulation and coding schemes,
    different rate matching schemes,
    different resource sizes, or
    different redundancy versions.

13. The method of claim 1, wherein the configuration information indicates a common time/frequency resource grid for payloads of a plurality of UEs.

14. The method of claim 13, wherein the configuration information indicates a plurality of frequency hopping spaces associated with the common time/frequency resource grid.

15. The method of claim 1, wherein the configuration information identifies at least one of:
    a resource unit size associated with the frequency hopping space,
    an aggregation level associated with the frequency hopping space,
    a time location of the frequency hopping space,
    a frequency location of the frequency hopping space, or
    a frequency hopping pattern of the frequency hopping space.

16. The method of claim 1, further comprising:
    selecting at least one of a resource unit size for the payload, an aggregation level for the payload, or the frequency hopping pattern based at least in part on at least one of:
    a size of the payload,
    a coverage requirement associated with the UE,
    a redundancy version of the payload,
    a power class of the UE,
    a radio frequency (RF) capability of the UE, or
    a bandwidth of the UE.

17. The method of claim 1, wherein mapping the one or more codewords to the plurality of resource units of the frequency hopping space is based at least in part on a frequency hopping pattern.

18. The method of claim 17, further comprising:
    receiving configuration information indicating the frequency hopping pattern.

19. The method of claim 18, wherein the configuration information indicates a guard time configuration for the frequency hopping pattern.

20. The method of claim 17, wherein the frequency hopping pattern is based at least in part on a hash function.

21. The method of claim 17, wherein the frequency hopping pattern includes a change in a hopping direction of the frequency hopping pattern.

22. The method of claim 17, wherein the frequency hopping pattern is based at least in part on a virtual resource block to physical resource block mapping pattern.

23. The method of claim 17, wherein mapping the one or more codewords to a plurality of resource units of the frequency hopping space comprises mapping the one or more codewords in accordance with a guard period configuration of the frequency hopping pattern.

24. The method of claim 1, wherein respective scrambling identifiers of the plurality of resource units are based at least in part on at least one of:
   a cell identifier,
   a UE identifier of the UE, or
   a hop index of a frequency hopping pattern adopted by the UE.

25. A method of wireless communication performed by a base station, comprising:
   transmitting, to a user equipment (UE), configuration information indicating at least one of a frequency hopping space or a frequency hopping pattern for a payload of a two-step random access channel of a two-step random access procedure; and
   receiving, during a first step of the two-step random access procedure, the payload as one or more codewords on a plurality of resource units of the frequency hopping space in accordance with the configuration information.

26. The method of claim 25, wherein the one or more codewords are a plurality of codewords corresponding to respective blocks of a plurality of blocks of the payload.

27. The method of claim 25, wherein the configuration information indicates a plurality of frequency hopping spaces including the frequency hopping space.

28. The method of claim 25, wherein the configuration information identifies at least one of:
   a resource unit size associated with the frequency hopping space,
   an aggregation level associated with the frequency hopping space,
   a time location of the frequency hopping space,
   a frequency location of the frequency hopping space,
   a guard time associated with the frequency hopping pattern, or
   a frequency hopping pattern of the frequency hopping space.

29. A user equipment (UE) for wireless communication, comprising:
   a memory; and
   one or more processors operatively coupled to the memory, the memory and the one or more processors configured to:
      receive, from a base station, configuration information for a two-step random access procedure;
      determine a frequency hopping space for transmitting a payload of a two-step random access channel of the two-step random access procedure;
      encode the payload into one or more codewords;
      map the one or more codewords to a plurality of resource units of the frequency hopping space; and
      transmit, during a first step of the two-step random access procedure, the one or more codewords to the base station on the plurality of resource units of the frequency hopping space.

30. A base station for wireless communication, comprising:
   a memory; and
   one or more processors operatively coupled to the memory, the memory and the one or more processors configured to:
      transmit, to a user equipment (UE), configuration information indicating at least one of a frequency hopping space or a frequency hopping pattern for a payload of a two-step random access channel of a two-step random access procedure; and
      receive, during a first step of the two-step random access procedure, the payload as one or more codewords on a plurality of resource units of the frequency hopping space in accordance with the configuration information.

* * * * *